United States Patent
Nafie et al.

(10) Patent No.: US 7,088,785 B2
(45) Date of Patent: Aug. 8, 2006

(54) BLOCK LEVEL SPACE TIME TRANSMIT DIVERSITY IN WIRELESS COMMUNICATIONS

(75) Inventors: Mohammed Nafie, Richardson, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 966 days.

(21) Appl. No.: 09/737,070

(22) Filed: Dec. 14, 2000

(65) Prior Publication Data

US 2001/0031018 A1 Oct. 18, 2001
US 2005/0058216 A9 Oct. 18, 2001

Related U.S. Application Data

(63) Continuation-in-part of application No. 09/224,401, filed on Dec. 31, 1998.
(60) Provisional application No. 60/185,792, filed on Feb. 29, 2000.

(51) Int. Cl.
*H04B 7/02* (2006.01)
*H04L 1/02* (2006.01)

(52) U.S. Cl. .................. 375/267; 375/299; 375/132; 375/295; 375/316; 455/101

(58) Field of Classification Search .............. 375/265, 375/267; 370/204, 335
See application file for complete search history.

(56) References Cited

U.S. PATENT DOCUMENTS 5,943,372 A * 8/1999 Gans et al. ............ 375/347
6,185,258 B1 * 2/2001 Alamouti et al. ......... 375/260
6,317,411 B1 * 11/2001 Whinnett et al. .......... 370/204
6,424,642 B1 * 7/2002 Schmidl et al. ........... 370/342
6,424,679 B1 * 7/2002 Dabak et al. ............. 375/267
6,430,231 B1 * 8/2002 Calderbank et al. ....... 375/295
6,430,321 B1 * 8/2002 Choo ..................... 382/299
6,501,803 B1 * 12/2002 Alamouti et al. ......... 375/265
6,515,978 B1 * 2/2003 Buehrer et al. ........... 370/342
6,542,556 B1 * 4/2003 Kuchi et al. ............. 375/299
6,587,515 B1 * 7/2003 Jafarkhani et al. ........ 375/299
6,643,338 B1 * 11/2003 Dabak et al. ............ 375/347
6,804,307 B1 * 10/2004 Popovic ................. 375/299
6,816,557 B1 * 11/2004 Kuchi et al. ............. 375/299
6,834,043 B1 * 12/2004 Vook et al. .............. 370/310
2002/0106008 A1 * 8/2002 Guey .................... 375/148
2003/0026349 A1 * 2/2003 Onggosanusi et al. ...... 375/267

OTHER PUBLICATIONS

"*Networks for Homes*", Amitava Dutta–Roy, Contributing Editor, IEEE Spectrum, Dec. 1999, pp. 26–33.

* cited by examiner

*Primary Examiner*—Stephen Chin
*Assistant Examiner*—Harry Vartanian
(74) *Attorney, Agent, or Firm*—Ronald O. Neerings; Wade James Brady, III; Frederick J. Telecky, Jr.

(57) ABSTRACT

Space time transmit diversity (9, 14, 17, 19) is applied at the block level to an original block of bits (12) in order to reduce the effects of fading in wireless communication systems that use nonlinear modulation schemes (13, 33). At the receiving end, fading parameters ($\alpha_1, \alpha_2$) are estimated ($\alpha_{E1}, \alpha_{E2}$) and the properties of complex conjugates are utilized (28, 29, 201, 202) to produce a result ($r_1, r_2$) that is representative of the original block of bits.

28 Claims, 3 Drawing Sheets

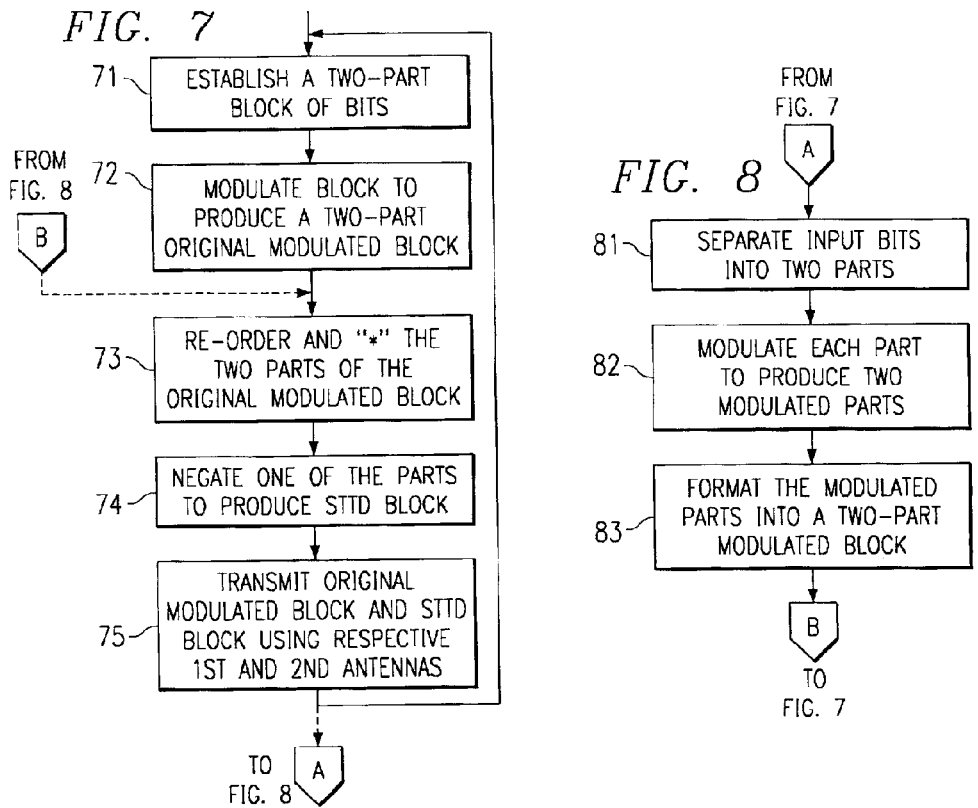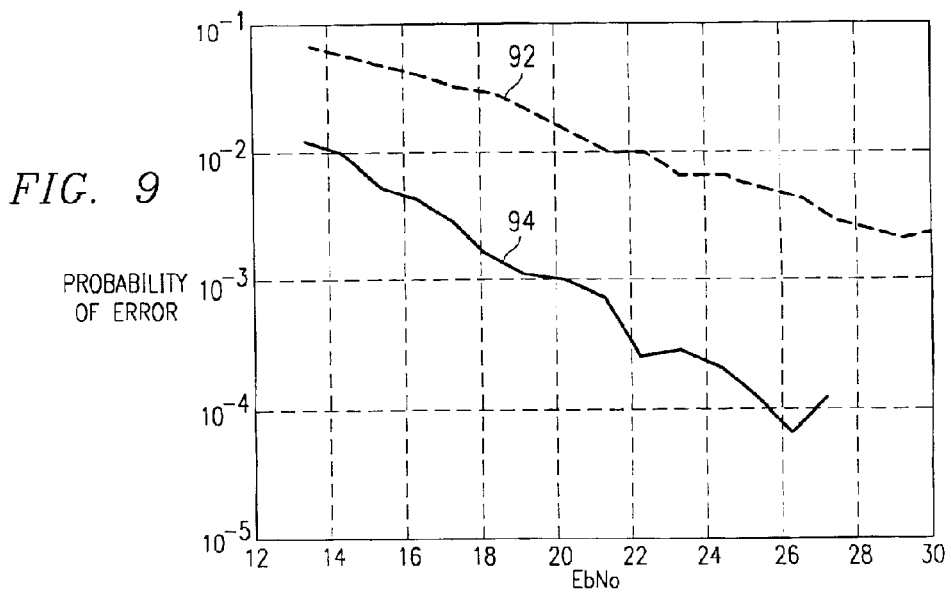

BLOCK LEVEL SPACE TIME TRANSMIT DIVERSITY IN WIRELESS COMMUNICATIONS

This application claims the benefit under 35 U.S.C. 119(e) of U.S. Provisional Application No. 60/185,792, filed Feb. 29, 2000; this application is a continuation-in-part of U.S. application Ser. No. 09/224,401, filed Dec. 31, 1998, now copending, and claims the benefit under 35 U.S.C. 120.

FIELD OF THE INVENTION

The invention relates generally to wireless communications and, more particularly, to antenna space time transmit diversity techniques for wireless communications.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a 10th century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and a maximum asymmetric data transfer rate of 723 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scattemets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Frequency hopping permits operation in noisy environments and permits multiple piconets to exist in close proximity. The frequency hopping scheme permits up to 1600 hops per second over 79 1-MHZ channels or the entire 2.4 GHz ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

In wireless communication systems such as described above, the well-known disadvantageous phenomenon of fading is encountered. Conventional transmit diversity techniques can provide several dB's of gain to thereby at least partially overcome the fading problem. Some known transmit diversity schemes require an estimate of the channel at the transmitter, which estimate can be made from previous receptions at the same frequency. However, because the operating environment is not totally static, such estimates are sometimes not very accurate.

Another known technique for overcoming fading is antenna space time transmit diversity. An example of this technique is disclosed in U.S. Ser. No. 09/205,029 filed on Dec. 3, 1998 and incorporated herein by reference. The space time transmit diversity disclosed therein is bit level space time transmit diversity for use with linear modulation schemes such as QPSK modulation. However, bit level space time transmit diversity cannot be used in wireless communication systems that utilize non-linear modulation schemes, for example the GFSK modulation scheme utilized in Bluetooth systems.

It is therefore desirable to apply space time transmit diversity techniques in wireless communication systems that utilize nonlinear modulation.

The present invention applies space time transmit diversity to achieve diversity gains in wireless communication systems that utilize nonlinear modulation schemes. In particular, space time transmit diversity (STTD) is applied at the block level to an original block of bits advantageously to reduce the effects of fading in wireless communication systems that use nonlinear modulation schemes. At the receiving end, fading parameters are estimated and the properties of complex conjugates are utilized to produce a result that is representative of the original block of bits.

BRIEF DESCRIPTION OF THE DRAWINGS

FIG. 7 illustrates exemplary operations which can be performed by the transmitting station of FIG. 1.

FIG. 8 illustrates exemplary operations which can be performed by the transmitting station of FIG. 5.

FIG. 9 illustrates the communication performance of a nonlinear modulation wireless communication system with (and without) block level space time transmit diversity according to the invention.

DETAILED DESCRIPTION

Figure 1:
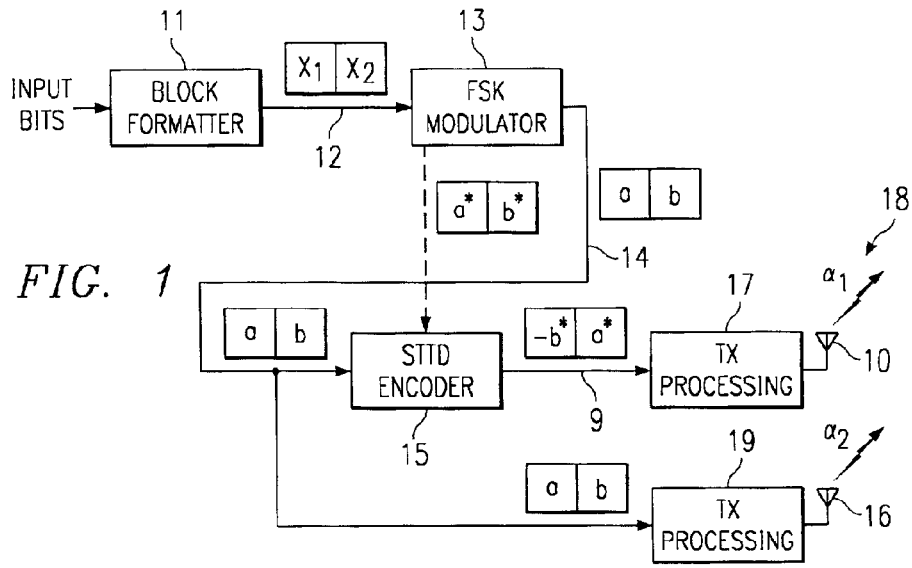
FIG. 1 diagrammatically illustrates pertinent portions of exemplary embodiments of a transmitting station that implements block level space time transmit diversity according to the invention.

FIG. 1 diagrammatically illustrates pertinent portions of exemplary embodiments of a transmitting station according to the invention. For example, the transmitting station of FIG. 1 could be a Bluetooth master or slave device. In FIG. 1, input digital information bits are applied to a block formatter 11 which establishes from the input bits an original block of bits having two parts $x_1$ and $x_2$, shown generally at 12. Parts $x_1$ and $x_2$ each include a plurality of bits. The two-part block of bits 12 is input to a nonlinear modulator such as an FSK (or GFSK) modulator 13 which uses conventional techniques to modulate a carrier signal with the block of bits to produce at 14 a modulated block of information including a first part a and a second part b which respectively correspond to the parts $x_1$ and $X_2$ at 12.

The two-part modulated block at 14 is input to an STTD encoder 15 which outputs at 9 a re-ordered two part block including a first part $-b^*$ which represents the negative of the complex conjugate of the second part b of the modulated block at 14, and also including a second part $a^*$ which is the complex conjugate of the first part a of the modulated block at 14. Complex conjugation as described herein can be performed in any desired conventional manner. For example, if $m=\cos(w_c\tau+\phi(t))$, then the complex conjugate $m^*=\cos(w_c\tau-\phi(t))$. As another example, the part $a^*$ of FIG. 1 can be produced by using the negative of the bits that were used to produce the modulated part a in FIG. 1, that is, by also modulating $-x_1$ at 13. In such embodiments, the modulator 13 can provide both $a^*$ and $b^*$, as shown by broken line in FIG. 1 (i.e., the modulator 13 performs the complex conjugate function of the encoder 15), so the encoder at 15 need only perform the re-ordering and negation operations.

The block output at 9 from the STTD encoder 15 is applied to a transmit processing section 17, and the modulated block 14 output from the modulator 13 is applied to another transmit processing section 19. The transmit processing sections 17 and 19 utilize conventional transmit processing techniques to effect transmission of the blocks 9 and 14 across a wireless communication link 18 (e.g., a Bluetooth link) via respective antennas 10 and 16. In the example of FIG. 1, transmission of the part $a^*$ of block 9 corresponds in time with transmission of the part b of block 14, and transmission of the part $-b^*$ of block 9 corresponds in time with transmission of the part a of block 14, thereby providing space and time transmit diversity. Also as shown in FIG. 1, the wireless communication channel associated with antenna 10 has a fading parameter designated as $\alpha_1$, and the wireless communication channel associated with antenna 16 has a fading parameter designated as $\alpha_2$.

Figure 2:
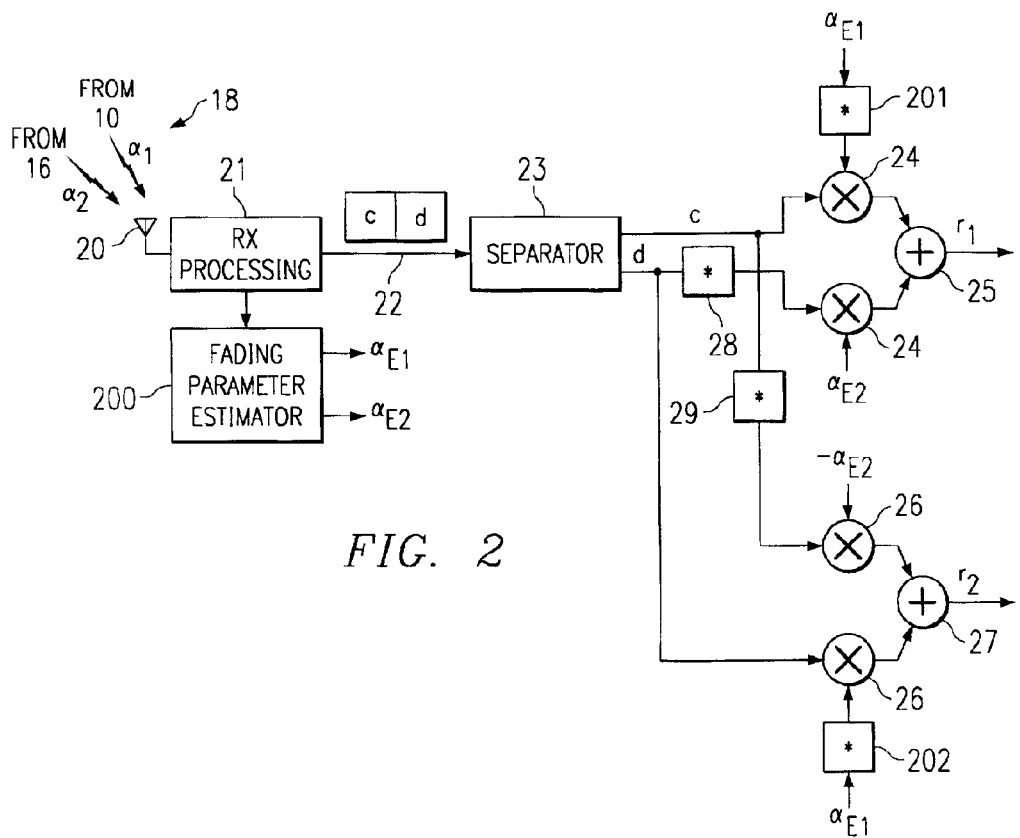
FIGS. 2–4 diagrammatically illustrate pertinent portions of exemplary embodiments of a receiving station which implements block level space time transmit diversity according to the invention.
Figure 3:
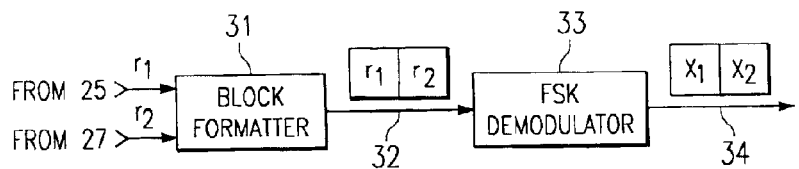

FIGS. 2 and 3 diagrammatically illustrate pertinent portions of exemplary embodiments of a receiving station according to the invention. For example, the receiving station could be a Bluetooth master device or a Bluetooth slave device. As shown in FIG. 2, the wireless communication signals transmitted by antennas 10 and 16 of FIG. 1 are received at an antenna 20 of a wireless communication interface. The antenna 20 is coupled to a receive processing section 21 of the wireless communication interface, which utilizes conventional receive processing techniques to produce from the received antenna signals a block of information including a first part c and a second part d, as designated generally at 22. The block at 22 is input to a separator 23 which separates the block into its constituent parts c and d. Recalling from FIG. 1 that blocks 9 and 14 were transmitted via the respective antennas 10 and 16 having the respective fading parameters $\alpha_1$ and $\alpha_2$ associated therewith, the parts c and d in FIG. 2 can be expressed as follows:

$$d=\alpha_2 b[[-]]\pm\alpha_1 a^* \qquad \text{Equation 2}$$

where the superscript "*" denotes the complex conjugate.

The receiving station can use conventional techniques to produce estimates $\alpha_{E1}$ and $\alpha_{E2}$ of the respective fading parameters $\alpha_1$ and $\alpha_2$. For example, a fading parameter estimater shown generally at 200 can be a conventional linear receiver, which provides fading parameter estimates in its normal operation. The fading parameter estimates $\alpha_{E1}$ and $\alpha_{E2}$ can be determined, for example, based on earlier transmissions received individually from the respective antennas 10 and 16, and can be stored in a suitable database (not explicitly shown). Using the estimated fading parameters, the following two signals can be formed:

$$r_1=\alpha_{E1}^* c+\alpha_{E2} d^* \qquad \text{Equation 3}$$

$$r_2=-\alpha_{E2} c^*+\alpha_{E1}^* d. \qquad \text{Equation 4}$$

In FIG. 2, the multiplier pairs at 24 and 26, the adders at 25 and 27, and the complex conjugators at 201, 202, 28 and 29 form a combiner that combines the parts c and d with the estimates $\alpha_{E1}$ and $\alpha_{E2}$ to produce the combined result signals $r_1$ and $r_2$ as defined by Equations 3 and 4 above. Combining Equations 3 and 4 with Equations 1 and 2, utilizing the symmetry of complex conjugates, and assuming that $\alpha_{E1}\approx\alpha_1$, and $\alpha_{E2}\approx\alpha_2$ the signals $r_1$ and $r_2$ can be expressed as follows:

$$r_1=(|\alpha_{E1}|^2+|\alpha_{E2}|^2)a \qquad \text{Equation 5}$$

$$r_2=(|\alpha_{E1}|^2+|\alpha_{E2}|^2)b \qquad \text{Equation 6}$$

As illustrated in FIG. 3, the signals $r_1$ and $r_2$ are input to a block formatter 31 which formats the signals $r_1$ and $r_2$ into a block of information at 32 having a first part $r_1$ and a second part $r_2$. This two-part block at 32 is input to a nonlinear (such as an FSK or GFSK) demodulator 33 which uses conventional demodulation techniques to produce at 34 the receiving station's determination of the original block of bits (see also 12 in FIG. 1).

Figure 4:
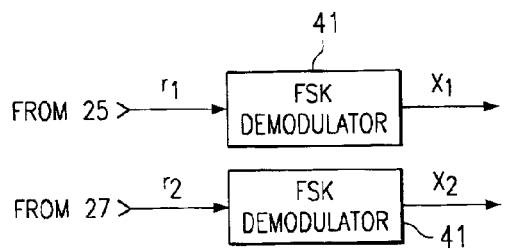

FIG. 4 diagrammatically illustrates further exemplary embodiments of a receiving station according to the invention. In the embodiment of FIG. 4, the signals $r_1$ and $r_2$ from FIG. 2 are input to respective parallel nonlinear demodulators 41 which use conventional demodulation techniques to produce the receiving station's determination of the first and second parts $x_1$ and $X_2$ of the original block of bits (see also 12 in FIG. 1).

Figure 5:
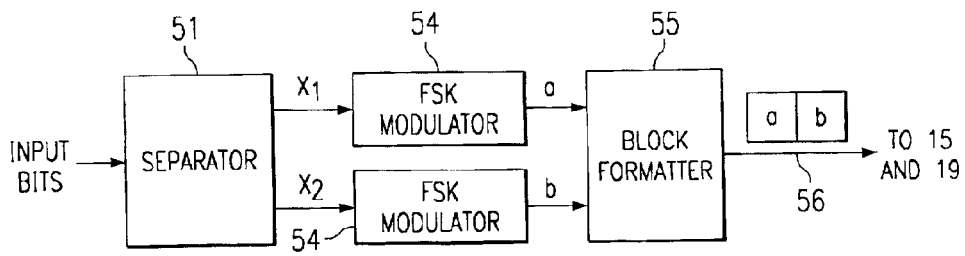
FIG. 5 diagrammatically illustrates pertinent portions of further exemplary embodiments of a transmitting station according to the invention.

FIG. 5 diagrammatically illustrates pertinent portions of further exemplary embodiments of a transmitting station according to the invention, which can be used in conjunction with the receiving station of FIG. 4. In the embodiment of FIG. 5, the input bits are applied to a separator 51 which produces therefrom the first and second parts $x_1$ and $x_2$ (see 12 in FIG. 1) in parallel format, thus providing the original block of bits in parallel format. The parts $x_1$ and $x_2$ are applied to respective parallel nonlinear modulators 54, which utilize conventional modulation techniques to produce a modulated block in parallel format, including the parts a and b which respectively correspond to the parts $x_1$ and $x_2$ (see also FIG. 1). The parts a and b are input to a block formatter 55, which produces at 56 a block of information including the parts a and b, which block can then be input to the STTD encoder 15 and the transmit processing section 19 of FIG. 1. Thus, the embodiment of FIG. 5 provides an alternative arrangement for producing the two-part modulated block illustrated generally at 14 in FIG. 1.

Figure 6:
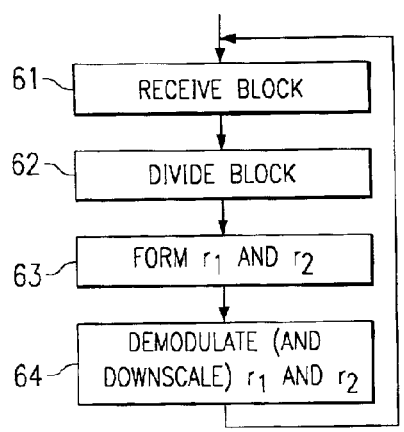
FIG. 6 illustrates exemplary operations which can be performed by the receiving station of FIGS. 2–4.

FIG. 6 illustrates exemplary operations which can be performed by the receiving stations of FIGS. 2–4. After a block of information is received at 61, the block is divided (separated) into two parts at 62, and the signals $r_1$ and $r_2$ are formed at 63. Thereafter, the signals $r_1$ and $r_2$ are demodulated (and downscaled) at 64 to produce the receiving station's determination of the original block of bits.

FIG. 7 illustrates exemplary operations which can be performed by the transmitting station of FIG. 1. At 71, a two-part block of bits is established (see 12 in FIG. 1). At 72, the two-part block of bits is modulated to produce a two-part original modulated block (see 14 in FIG. 1). At 73, the two parts of the original modulated block are re-ordered and complex-conjugated, and at 74 one of the re-ordered, complex-conjugated parts is negated, thereby producing an STTD block (see also 9 in FIG. 1). At 75, the original modulated block and the STTD block are transmitted (in the timewise relationship described above) using respective first and second antennas.

FIG. 8 illustrates exemplary operations which can be performed by the transmitting station of FIG. 5. At 81, the input bits are separated into two parts (original block in parallel format). At 82, the two parts are respectively modulated to produce two corresponding modulated parts (modulated block in parallel format). At 83, the modulated parts are formatted into a two-part modulated block. From this point, operations can proceed to 73 in FIG. 7 (see broken line in FIG. 7) and, after the operations at 75 in FIG. 7, operations can return to 81 (see broken line in FIG. 7).

FIG. 9 illustrates exemplary simulation results for a conventional nonlinear-modulated wireless communication system at 92 and for a nonlinear-modulated wireless communication system which utilizes space time transmit diversity according to the invention at 94. The curve 94 demonstrates better performance.

It will be evident to workers in the art that the embodiments of FIGS. 1–8 can be readily implemented, for example, by suitably modifying software, hardware, or a combination of software and hardware, in conventional wireless transmitting and receiving stations that support plural transmit antennas, for example Bluetooth master and slave devices.

Although exemplary embodiments of the invention are described above in detail, this does not limit the scope of the invention, which can be practiced in a variety of embodiments.

What is claimed is:

1. A diversity method, comprising:
   providing an original block of bits having first and second parts;
   modulating the original block of bits with a carrier signal to produce a modulated block of information having first and second parts that respectively correspond to said first and second parts of said original block of bits;
   producing a further block of information including first and second parts which respectively correspond to the second and first parts of the modulated block and which are respective negative and positive complex conjugates of the second and first parts of the modulated block; and
   using first and second antennas to respectively transmit the modulated block and the further block over a wireless communication link such that the first part of the modulated block is transmitted in timewise correspondence with the second part of the further block and the second part of the modulated block is transmitted in timewise correspondence with the first part of the further block.

2. The method of claim 1, wherein each of the first and second parts comprise a plurality of bits.

3. The method of claim 1, wherein said providing step includes providing the first and second parts of the original block in parallel, and wherein said modulating step includes modulating the first and second parts of the original block in parallel.

4. The method of claim 1, wherein said modulating step includes one of FSK and GFSK modulating.

5. A method of determining an original block of bits from first and second antenna signals received via a wireless communication link, comprising:
   producing a received block of information having first and second parts from the first and second antenna signals;
   complex conjugating first and second parts of the received block to produce first and second complex conjugate parts; and
   combining the first and second parts with respective second and first complex conjugate parts and fading parameter information indicative estimated fading parameters associated with the first and second antenna signals to produce a combined result that is representative of the original block of bits.

6. The method of claim 5, wherein the fading parameter information includes a complex conjugate of the first estimated fading parameter and also includes the second estimated fading parameter.

7. The method of claim 5, wherein said combining step includes multiplying the first and second parts by a complex conjugate of the first estimated fading parameter to produce first and second products, respectively, and multiplying the first and second complex conjugate parts by a negative of the second estimated fading parameter and the second estimated fading parameter, respectively, to produce third and fourth products, respectively.

8. The method of claim 7, wherein said combining step includes adding the first product to the fourth product to produce a first received part, and adding the second product to the third produce to produce a second received part, said combined result including the first and second received parts.

9. The method of claim 8, including demodulating the first and second received parts to produce a demodulated result, and making a determination that the demodulated result is the original block of bits.

10. The method of claim 9, wherein said demodulating step includes demodulating the first and second received parts in parallel to produce first and second constituent parts of the demodulated result.

11. The method of claim 9, including formatting the first and second received parts into a further block, said demodulating step including demodulating the further block to produce a demodulated block, said making step including making a determination that the demodulated block is the original block of bits.

12. The method of claim 9, wherein said demodulating step includes FSK demodulating.

13. The method of claim 9, wherein said demodulating step includes GFSK demodulating.

14. A apparatus, comprising:
   an input for receiving an original block of bits having first and second parts;
   a modulator coupled to said input for modulating the original block of bits with a carrier signal to produce a modulated block of information having first and second parts that respectively correspond to said first and second parts of the original block of bits;

an encoder coupled to said modulator for receiving the modulated block of information and producing therefrom a further block of information including first and second parts which respectively correspond to the second and first parts of the modulated block and which are respective negative and positive complex conjugates of the second and first parts of the modulated block; and first and second antennas respectively coupled to said modulator and said encoder for respectively transmitting the modulated block and the further block over a wireless communication link such that the first part of the modulated block is transmitted in timewise correspondence with the second part of the further block and the second part of the modulated block is transmitted in timewise correspondence with the first part of the further block.

15. The apparatus of claim 14, wherein each of the first and second parts comprise a plurality of bits.

16. The apparatus of claim 14, wherein said modulator includes one of an FSK demodulator and a GFSK modulator.

17. The apparatus of claim 14, wherein a portion of said encoder is provided in said modulator.

18. The apparatus of claim 14, provided as a Bluetooth device.

19. The apparatus of claim 14, wherein said modulator is operable for modulating the first and second parts of the original block in parallel.

20. A wireless communication apparatus, comprising:

a wireless communication interface for receiving from a wireless communication link first and second antenna signals that represent an original block of bits, said wireless communication interface operable for producing a received block of information having first and second parts from said first and second antenna signals;

a complex conjugator coupled to said wireless communication interface for complex conjugating first and second parts of the received block to produce first and second complex conjugate parts; and a combiner coupled to said complex conjugator and to said wireless communication interface and having an input for receiving fading parameter information indicative of first and second estimated fading parameters respectively associated with the first and second antenna signals, said combiner operable for combining the first and second parts with respective second and first complex conjugate parts and the fading parameter information to produce a combined result that is representative of the original block of bits.

21. The apparatus of claim 20, wherein the fading parameter information includes a complex conjugate of the first estimated fading parameter and also includes the second estimated fading parameter.

22. The apparatus of claim 20, wherein said combiner includes multipliers for multiplying the first and second parts by a complex conjugate of the first estimated fading parameter to produce respective first and second products and for multiplying the first and second complex conjugate parts by a negative of the second estimated fading parameter and the second estimated fading parameter, respectively, to produce respective third and fourth products.

23. The apparatus of claim 22, wherein said combiner includes adders coupled to said multipliers for adding the first product to the fourth product to produce a first received part and for adding the second product to the third product to produce a second received part, said combined result including the first and second received parts.

24. The apparatus of claim 23, including a demodulator coupled to said adders for demodulating the first and second received parts to produce a demodulated result and for providing the demodulated result as a determination of the original block of bits.

25. The apparatus of claim 24, wherein said demodulator is operable for demodulating the first and second received parts in parallel to produce first and second constituent parts of the demodulated result.

26. The apparatus of claim 24, including a formatter coupled between said demodulator and said adders for formatting the first and second received parts into a further block, said demodulator operable for demodulating the further block to produce a demodulated block and for providing the demodulated block as a determination of the original block of bits.

27. The apparatus of claim 20, wherein said demodulator includes one of an FSK demodulator and a GFSK demodulator.

28. The apparatus of claim 20, provided as a Bluetooth device.

* * * * *